Figure 1:
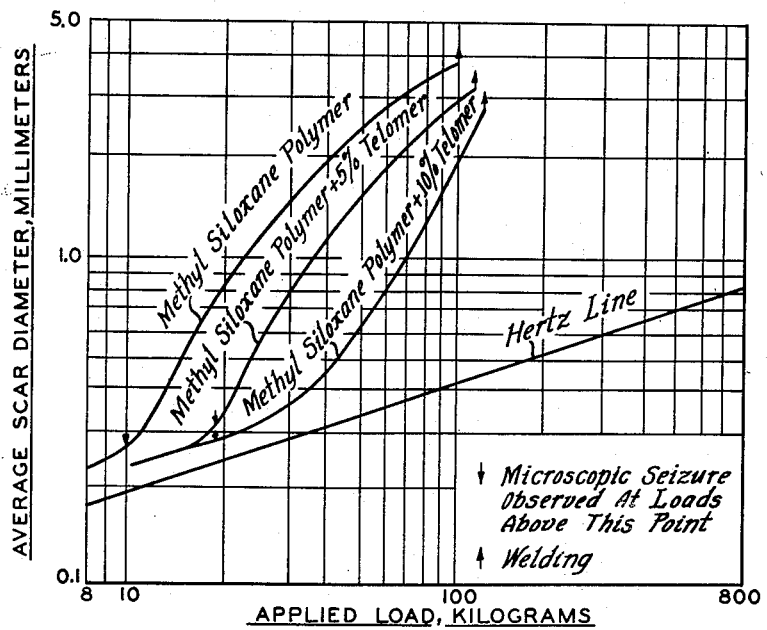

March 8, 1960  D. E. NEUNHERZ  2,927,893
NOVEL COMPOSITION OF IMPROVED LUBRICATING PROPERTIES
COMPRISING A FLUOROCHLORO POLYMER
Filed Sept. 20, 1955

INVENTOR.
DICKSON E. NEUNHERZ
BY G. H. Palmer
Cruzan Alexander
ATTORNEYS

United States Patent Office 2,927,893
Patented Mar. 8, 1960

2,927,893

NOVEL COMPOSITION OF IMPROVED LUBRICATING PROPERTIES COMPRISING A FLUOROCHLORO POLYMER

Dickson E. Neunherz, Columbus, Ohio, assignor, by mesne assignments, to Minnesota Mining and Manufacturing Company, St. Paul, Minn., a corporation of Delaware Application September 29, 1955, Serial No. 535,373

3 Claims. (Cl. 252—49.6)

This invention relates to a novel composition of matter having improved lubricating properties, and to a method for the preparation thereof. In one aspect this invention relates to a novel normally liquid lubricating composition having improved properties. In another aspect this invention relates to a novel grease composition having improved lubricating properties.

A variety of oils and greases which are useful as lubricants are commercially available today. These compositions are satisfactory in many applications, but where chemical stability, for example, is required, they usually prove inadequate. Presently available lubricating compositions are also relatively useless as high pressure lubricants and at elevated temperatures due to their lack of sufficient load-carrying capacity and due to their inflammable nature. Thus such compositions are unsuitable as lubricants in applications involving a high rubbing speed between lubricated surfaces and are particularly unsuitable as lubricants between ferrous surfaces such as steel on steel. In addition to these properties many of the presently available materials having oil and grease characteristics possess other undesirable properties which limit their application as lubricants. For example, many possess a relatively high change in viscosity with temperature especially over a wide range of temperatures, corrosively attack natural and synthetic rubbers, tend to solidify at low temperatures, and have poor film strength. In addition many of the presently available grease compositions gradually break down under conditions where high shearing stresses are involved.

It is an object of the present invention to provide a novel composition having improved lubricating properties.

Another object is to provide a novel lubricating composition having improved lubricity properties such as load-carrying capacity and which is chemically stable.

Another object is to provide a novel composition having improved lubricity properties and which is suitable for use in corrosive atmospheres and under extreme temperature conditions.

A further object is to provide a non-flammable lubricating composition having improved properties.

A further object is to provide a novel lubricating composition having a relatively uniform viscosity over a relatively wide range of temperatures and good load carrying properties.

A still further object is to provide a normally liquid lubricating composition which is chemically and physically superior to currently available compositions and to provide a process for the preparation of such a composition.

A still further object is to provide a novel grease composition having improved lubricating properties and which is chemically and physically superior to currently available compositions and to provide a process for the preparation of such a composition.

Further objects and advantages of the present invention will become apparent to those skilled in the art from the accompanying description and disclosure.

Accordingly, these objects are accomplished by the preparation of a novel composition which comprises an admixture of a low molecular weight polymer of a perfluorochloroolefin and a normally liquid silicone oil. Of the low molecular weight polymers of a perfluorochloroolefin which are employed as one component of the compositions of the present invention, the telomer products of a perfluorochloroethylene having halogen-containing terminal groups are used to best advantage. The normally liquid silicone oils employed as a second component of the novel composition of this invention include the organic silicone oils in which the silicon atoms are bonded to aromatic and/or aliphatic radicals by a carbon to silicon linkage. The linear siloxane polymers represent the preferred class of silicone oil which is employed. The novel compositions of the present invention have particularly good lubricity properties such as a high load carrying capacity as evidenced by their high Point B values, and are particularly useful as extreme pressure lubricants, and in an environment subject to exposure to strong and corrosive chemicals and fuels and to relatively extreme conditions of temperature, that is, at temperatures between about minus 55° C. and about 200° C.

The low molecular weight polymer of perfluorochloroethylenes which is preferably employed as one component of the composition of this invention is prepared by telomerization of perfluorochloroethylenes such as trifluorochloroethylene and difluorodichloroethylene, to produce oils, greases and waxes. Also useful are cotelomers of the above perfluorochloroethylenes prepared by cotelomerization with each other and with hydrogen-containing halogenated olefins such as vinyl fluoride, vinylidene fluoride, vinyl chloride and vinylidene chloride. The particularly preferred telomers are those which are prepared by the homotelomerization of trifluorochloroethylene in the presence of a sulfuryl halide, such telomers having an even number of carbon atoms and a halogen terminal group.

As used herein the term "telomer" includes homotelomers and cotelomers, the term "telomerization" includes homotelomerization and cotelomerization, and by the term "low molecular weight polymer" is meant a polymer having a molecular weight not higher than 10,000.

The preparation of the above-mentioned particularly preferred class of low molecular weight polymers of perfluorochloroethyenes which is used as one component of the compositions described herein is accomplished by telomerizing the perfluorochloroethylene in the presence of a sulfuryl halide and a catalyst such as benzoyl peroxide which is usually dissolved in an inert solvent, at a temperature between about 75° C. and about 210° C. The telomerization may be effected in the presence or absence of sulfur dioxide as desired. The homotelomers of trifluorochloroethylene thereby produced have the general formula $Y_1—(CF_2—CFCl)_n—Y_2$ wherein $Y_1$ and $Y_2$ are members selected from the group consisting of fluorine, chlorine, and bromine and may be the same or different, and $n$ is an integer of at least one, preferably of at least 4, and is not more than 20. The telomers may be separated by conventional distillation. The distillable substances obtained by telomerization of trifluorochloroethylene in the presence of sulfuryl chloride, for example, are sufficiently stable so as not to absorb appreciable amounts of fluorine even though exposed to the gas for 24 hours at a temperature of 60° C. or so as not to significantly pyrolytically decompose at temperatures up to 200° C.

For purposes of clarity a specific example of the telomerization of the preferred monomer, trifluorochloroethylene, is presented below.

EXAMPLE 1

A pressure system was flushed out with nitrogen and charged with a peroxide solution (3.5 parts of benzoyl peroxide dissolved in 38 parts of carbon tetrachloride) and 135 parts of sulfuryl chloride. This system was cooled to about −25° C. or below, and 116 parts of trifluorochloroethylene was added. The system was closed and heated to about 95° C. for a period of 4 hours during which time the mixture was mechanically agitated. A maximum gage pressure of 300 pounds per square inch was reached and then gradually subsided. At the end of the telomerization, the gases were bled from the system and the liquid product was transferred to a distilling pot and the carbon tetrachloride solvent was boiled off by heating the mixture to a pot temperature of 165° C. at atmospheric pressure. The gel-like product was distilled at a vapor temperature up to 175° C. at 35 mm. of mercury to remove very low molecular weight polymers. Final distillation was conducted at 1 mm. mercury pressure and at a vapor temperature up to 230° C. The telomer yield was 78% with 93% of the product distilled. The telomer products prepared by the above-described process have an even number of carbon atoms in the chain and halogen terminal groups. Since sulfuryl chloride is usually employed as the telogen, the halogen terminal groups will usually be chlorine. Other telogens which may be employed are sulfuryl fluoride, sulfuryl bromide and fluorosulfuryl chloride.

Table I below describes the physical properties of the trifluorochloroethylene telomeric fractions which are preferred as one component of the presently described compositions. The particular fractions referred to in the table are normally liquid oils, greases and waxes which were prepared by the telomerization process above described. The telomer product is usually distilled into the fractions such as are listed in Table I. However, narrower (e.g. the trimer, tetramer, pentamer, etc., and mixtures thereof) or broader cuts can be made if desired. The molecular weights are approximate or average for each fraction. Actually the molecular weight of the telomers of trifluorochloroethylene ranges between about 300 and 2300. Fractions 2 and 3 of Table I are normally liquid oils, having between about 4 and 20 carbon atoms, and are the particularly preferred telomer products used as one component of the presently described novel compositions, especially in the compositions which are to be used as extreme pressure lubricants and particularly as anti-seize lubricants between ferrous surfaces where good load carrying properties are necessary.

*Table I.—Physical properties of trifluorochloroethylene—sulfuryl chloride telomer products:* $Cl(CF_2CFCl)_nCl$

| Fraction | 1 | 2 | 3 | 4 |
|---|---|---|---|---|
| Molecular Weight | 500 | 630 | 780 | 940 |
| Boiling Range, ° C., at 1 mm. Hg | up to 95 | 95–132 | 132–208 | 208–245 |
| Viscosity, Centistokes: | | | | |
| 100° F | 3 | 25 | 220 | |
| 210° F | | 3.08 | 10 | 40 |
| Viscosity, Centipoises: | | | | |
| 100° F | 5.6 | 47 | 425 | |
| 210° F | | 5 | 18 | 75 |
| Pour Point, ° F | <−70 | −45 | +30 | +90 |
| Specific Gravity: | | | | |
| 68° F./39° F | 1.86 | 1.93 | 1.96 | |
| 160° F./39° F | | 1.85 | 1.88 | 1.92 |
| Refractive Index, $n_D$: | | | | |
| 77° F | 1.401 | 1.405 | 1.410 | |
| 160° F | | | | 1.398 |

Other low molecular weight polymers of trifluorochloroethylene which may be employed are those obtained by the thermal cracking of high molecular weight polytrifluorochloroethylene thermoplastic and by a controlled polymerization of trifluorochloroethylene. The processes which may be employed to obtain such low molecular weight polymers of trifluorochloroethylene are those described in U.S. Patent 2,636,908, issued April 28, 1953, to A. L. Dittman and J. M. Wrightson, and in U.S. Patent 2,636,907, issued April 28, 1953, to W. T. Miller. It should be noted, however, that there are significant differences between the polymeric trifluorochloroethylene products produced by these processes and those produced by telomerization. For example, polymers produced by the thermal cracking process or by controlled polymerization to produce low molecular weight material have a random number of carbon atoms and no single identifiable species. The end group in the cracked polymers are unknown but are believed to be fluorine. Cracked polymer also has a higher fluorine content and a lower chlorine content than telomer. The low molecular weight polymers of trifluorochloroethylene produced by polymerization with sulfuryl chloride have better characteristics as ingredients in the compositions of the present invention than the polymers of trifluorochloroethylene produced by other techniques and their use is therefore preferred.

As mentioned previously, the silicone oils which are used to best advantage as a second component of the lubricating compositions of the present invention are the liquid organic siloxane polymers in which the siloxane structure, —Si—O—Si—, occurs successively along the polymer chain and in which the major number of residual valences of the silicon atoms are satisfied by the substitution thereon of monovalent organic radicals such as aromatic and aliphatic radicals. For the purpose for which such silicone oils are used in the present invention, the aliphatic substituents of the polymers are preferably low molecular weight alkyl radicals (i.e. those having not more than about 5 carbon atoms per radical) such as methyl, ethyl and butyl radicals, and the aromatic substituents are preferably phenyl, halogen substituted phenyl radicals, and alkyl substituted phenyl radicals in which the alkyl group is halogenated. The aromatic siloxane polymers are preferably those in which a major proportion of the silicon atoms are bonded to aliphatic radicals such as methyl radicals, and in which the remaining number of organic radicals are aromatic radicals. Typical examples of specific silicone oils which may be used are the dimethyl siloxane polymers having a viscosity of at least 10 centistokes at 25° C. (77° F.) and preferably a viscosity of at least 20 centistokes at 25° C. Such methyl substituted siloxanes are commercially known as the Dow Corning Silicone Type 200 fluids and are mixtures of polymers of the homologous series of trimethyl end-blocked dimethyl siloxane polymers having a viscosity at 25° C. ranging up to about 12,500 centistokes. Other suitable siloxane polymers which may be used in accordance with the present invention are the aliphatic and aromatic substituted siloxane polymers such as the methyl phenyl siloxane polymers of medium aromaticity commercially available as Dow Corning DC–550 silicone oil, and those containing a low ratio of phenyl to methyl groups commercially available as Dow Corning DC–510 silicone oils. Further examples of suitable aliphatic and aromatic substituted siloxane polymers are the methyl phenyl siloxanes in which the phenyl radical is substituted with halogen such as in methyl-p-bromophenyl siloxane polymer, methyl p-chlorophenyl siloxane polymer, methyl m-trifluoromethyl phenyl siloxane polymer and methyl 3,4-dichlorophenyl siloxane polymer. It is within the scope of the present invention to employ any admixture of the above-mentioned silicone oils as an ingredient of the presently described novel compositions.

It is to be understood that by the term "siloxane polymer" as used herein is meant a silicone oil having the following general formula:

$$R_3Si—O—(Si—O)_n—SiR_3$$

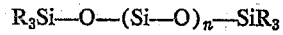

wherein R is an organic radical such as a methyl, ethyl, phenyl, halogen-substituted phenyl or halogen-containing alkyl substituted phenyl radicals, and $n$ is an integer of at least 2. Such silicones are also referred to in the literature as organo polysiloxanes.

The preparation of the silicone fluids which are used is well-known to those skilled in the art. In general they are prepared by the hydrolysis of hydrolyzable organosilanes, followed by complete or partial condensation of the hydrolysis products. For example, hydrolysis of dimethyl dichlorosilane followed by condensation of the resultant product of hydrolysis yields methyl siloxane polymers similar to those of the Dow Corning DC–200 silicone fluids above-mentioned. As a further illustration of the method for the preparation of the polysiloxanes which may be employed, p-chlorophenyl methyl diethoxy silane is hydrolyzed in an acid medium. The hydrolysis product thereby obtained is then condensed under reduced pressure with the hydrolysis product of hexamethyl disiloxane at a temperature of about 120° C. for several hours to yield methyl p-chlorophenyl siloxane polymer.

The physical nature of the compositions of the present invention varies from relatively thin or light liquids of low viscosity to more viscous and heavier liquids and grease compositions. The concentration of the low molecular weight perfluorochlorocarbon component as compared to the concentration of the liquid silicone component may vary over relatively wide limits. Generally speaking, the particular concentration of components which is employed will depend upon the nature and properties of each component and on the desired characteristics of the resultant lubricating composition. The compositions of this invention are made by admixing the sulfuryl chloride telomer of trifluorochloroethylene, for example, and the silicone oil under conditions which insure thorough commingling of each component. In general, the weight ratio of the low molecular weight perfluorochloro polymer component to the silicone oil component is between about 0.01:1 and about 0.4:1. The use of more than about 35 weight percent of the perfluorochloro polymeric component does not appreciably improve the load-carrying properties of the resultant compositions, although the use of higher concentrations may improve other properties of the resultant composition. The preferred weight ratio of the low molecular weight perfluorochloro polymer to silicone oil is between about 0.03:1 and about 0.2:1, particularly when the telomers of trifluorochloroethylene having a viscosity at 210° F. of between about 3 and about 40 centistokes are admixed with the polysiloxanes having a viscosity at 25° C. of at least 20 centistokes. These latter compositions have particularly good lubricity properties as evidenced by their Point B values and are particularly good lubricants for steel sliding on steel.

It is within the scope of the present invention to add as a third component a thickening or gelling agent in order to obtain grease compositions which find particular usefulness as extreme pressure lubricants between rubbing ferrous surfaces. The thickeners which may be employed comprise metal salts of organic acids and are preferably the metal salts of organic perfluorochlorocarboxylic acids, siliceous materials such as the bentonites and estersils and aryl substituted ureas.

The perfluorochlorocarboxylic acids which are used to produce the salts which may be used as gelling agents in accordance with this invention are prepared from fluorochlorocarbon oils which are generally similar to those described above. They may be prepared, for example, by the potassium permanganate oxidation of a thermally cracked trifluorochloroethylene polymer. Such acids also may be prepared by hydrolysis with fuming sulfuric acid of the above-mentioned sulfuryl halide telomers of trifluorochloroethylene. The mixed telomer or any fraction thereof is treated with fuming sulfuric acid containing from 0 to 20 percent sulfur trioxide at a temperature between about 140° C. and about 210° C. for a period of time ranging between about 5 and about 25 hours to produce mono-carboxylic acids having the formula $Cl(CF_2CFCl)_{n-1}CF_2COOH$ wherein $n$ is as above-defined. Salts are prepared from these acids by replacement of the hydrogen ions of the acids by the desired metal ions. The sodium, calcium, aluminum and cadmium salts of these organic perfluorochlorocarboxylic acids represent a preferred class of gelling agents which may be used in the preparation of the grease compositions of the present invention. Typical examples of this class of gelling agent are the calcium and aluminum salts of 3,5,7,8-tetrachloroundecafluorooctanoic acid and the sodium and calcium salts of 3,5,7,9,10-pentachloroperfluorodecanoic acid.

The siliceous materials which also may be used in preparing the novel grease compositions of this invention are the various oxides of silicon and derivatives thereof. The oxides of silicon are available commercially under the designation Silene (calcium silicate), Hi-Sil (hydrated silica), Calcene (calcium silicate), and Syloid (essentially pure silica). These are finely divided siliceous compounds. Other derivatives of silica which are employed are hydrous alumina silicate, hydrous magnesium silicate, and various naturally occurring siliceous clays such as attapulgite, and bentonite. Particularly suitable siliceous materials are the quaternary ammonium derivatives of the silicates or bentonites. Examples of such quaternary ammonium bentonites are decyl ammonium bentonite, dimethyl dioctadecyl ammonium bentonite which is commercially available as Bentone 34, and dioctadecyl ammonium bentonite. Bentone 34 is the preferred quaternary ammonium bentonite.

Another preferred type if siliceous material which may be employed as a gelling agent in accordance with the present invention are the estersils which are prepared by reacting an alcohol with silica. The alcohols with which the silica is esterified are the aliphatic alcohols having between 2 and 18 carbon atoms, preferably between 3 and 12 carbon atoms, and are, for example, ethyl, n-propyl, n-butyl, n-hexyl, n-dodecyl and isobutyl alcohols as well as cyclopentanol, and cyclohexanol. The quantity of the aliphatic radicals (i.e. the organophilic surface) on the surface of the estersil should be sufficient to provide a layer, usually mono-molecular, on at least 25 percent of the surface of the silica and preferably on at least 50 percent of the surface.

The preparation of the preferred grease compositions of the present invention is effected by admixing with, and intimately dispersing within the selected telomer fraction, a minor proportion of the gelling agent. The exact quantity of the gelling agent that is admixed with the telomer: silicone oil blends will depend upon the desired characteristics of the grease. Generally, however, the concentration of the gelling agent will be between about 1 and about 25 weight percent based on the combined total weight of the low molecular weight polymer of the perfluorochloroolefin and silicone oil, the preferred concentration ranging between about 2 and about 15 weight percent. The consistency of the grease is also controlled by the proper selection of a particular telomer fraction and silicone oil. Low molecular weight telomers are available as light to heavy oils, light to heavy greases and soft to hard waxes. By selection of a particular fraction of telomer and silicone oil or by blending various fractions, and by using a particular concentration of gelling agent, greases varying from light to relatively mobile gels to hard greases are obtained. Generally less of the thickener is used with the higher molecular weight telomers (i.e. greases and waxes) and more viscous silicones than with the lower molecular weight telomers (i.e. oils) and less viscous silicones. The selection of the proper composition is determined by the particular end use of the grease. Thus where heavy duty lubricants are required, higher concentrations of thickener and higher viscosity telomers and silicones are used.

Various additives may be incorporated within the distillable perfluorochloro polymeric-silicone oil admixtures in addition to the gelling agent to improve various characteristics of the end product. For example, surface active agents may also be added to improve, for example, the adhesive characteristics of the grease compositions. These surface active agents are organic amines which are prepared by reacting ammonia or a low molecular weight amine with epichlorohydrin or with neutral esters of a metaphosphoric acid. These surface active agents are commercially available under the trade name "Vitamine." The surface active agents when used are employed in concentrations not exceeding about 5 weight percent of the total weight of the composition. Other materials which may be added to the compositions of the present invention are molybdenum sulfide, graphite, metal sulfonates, etc.

It is also within the scope of the present invention to include as a component of the compositions of the present invention another lubricating oil such as synthetic branched chain esters of organic acids such as the 2-ethylhexyl ester of pelargonic acid, sebacic and adipic acids, and lubricating oils of natural origin such as the paraffinic and napthenic base oils derived from petroleum stocks. When employed as an ingredient of the telomer oil: silicone oil blends of the present invention, they are generally used in a minor proportion and preferably in an amount less than 35 weight percent based on the combined total weight of the resultant composition.

The following examples are offered as a better understanding of the present invention and are not to be construed as unnecessarily limiting thereto. The Point B values given in the following examples were determined in a Shell Four-Ball Extreme-Pressure Lubricant Tester. The Shell Four-Ball Tester consists essentially of three contacting balls (usually steel) held in a fixed position relative to each other and a fourth ball above and in contact with the other three. The fourth ball is pressed against three stationary balls with an adjustable force and rotated at constant speed. The points of contact are lubricated by oil in a cup surrounding the four-ball assembly. During a test, circular scars are worn in the surface of the three stationary balls. The diameter of the scars, which is a measure of wear, depends on the load, speed, time of test, and character of the lubricant. The applied load is then plotted against the average scar diameter as shown in the accompanying Figures 1 and 2. The Point B value which indicates the load-carrying capacity of a lubricating composition represents that point on the wear-load diagrams corresponding to the maximum load at which no metal-to-metal contact or seizure occurs and beyond which marked deviations from the theoretical Hertz line occur.

EXAMPLES 2–11

A number of liquid lubricating compositions were prepared by intimately admixing various proportions of the sulfuryl chloride-trifluorochloroethylene telomer product prepared as described in Example 1 above and listed as Fraction 2 of the above Table I (boiling point 95°–132° C. at 1 mm. Hg pressure; viscosity at 210° F. of 3.08 centistokes) with dimethyl siloxane polymers (Dow Corning DC–200 Series) of varying viscosity. The exact proportion of telomer and the viscosity of the particular methyl siloxane polymer are given in Examples 3, 4, 6, 7, 9 and 11 of the following Table II. For comparison purposes no telomer was added to the indicated methyl siloxane polymer in Examples 2, 5, 8, and 10. The Point B values of these liquid lubricating compositions were determined in the above-described Shell Four-Ball Tester with a one minute application of the machine in each test. The details of the results obtained are given in Table II, that is, the Point B values, and the viscosity at 100° F. and 210° F. of each lubricating composition. The viscosity temperature coefficient of each composition was calculated from the viscosity values at 100° F. and 210° F.

Microscopic seizure of the telomer of trifluorochloroethylene employed in these examples is observed at a 10 kilogram load, at which load microscopic seizure of each of the methyl siloxane polymers employed is also observed.

The improved lubricity properties as evidenced by the Point B values, of the admixtures of Examples 3, 4, 6, 7, 9, and 11 are unexpectedly good. As indicated above, the loads at which incipient seizure is observed for either the telomer component or polymethylsiloxane component above are approximately the same, although admixture of the two yields lubricating compositions having significantly greater values. Further, in Examples 4 and 7 above, the Point B values of the silicone component is increased approximately 40 percent by the addition thereto of only 10 percent by weight of the sulfuryl chloride-trifluorochloroethylene component. Another unexpected and significant result is that the load-carrying capacity is improved by admixing these two components without substantial sacrifice of the desirable viscosity-temperature characteristics of the silicone oil component.

Table II.—Viscosity and load carrying properties of admixtures of trifluorochloroethylene-sulfuryl chloride telomer [1] and methyl siloxane polymers [2]

| Example | Weight Percent of Telomer | Methyl Siloxane Polymer, Viscosity at 77° F., Centistokes | Point B, Kilograms | Viscosity, centistokes | | V.T.C.[3] |
|---|---|---|---|---|---|---|
| | | | | 100° F. | 210° F. | |
| 2 | 0 | 50 | 8 | 41.09 | 16.48 | 0.60 |
| 3 | 5 | 50 | 18 | 39.06 | 16.31 | 0.58 |
| 4 | 10 | 50 | 30 | 36.97 | 14.41 | 0.61 |
| 5 | 0 | 350 | 10 | 272.4 | 106.3 | 0.61 |
| 6 | 5 | 350 | 24 | 252.5 | 102.8 | 0.59 |
| 7 | 10 | 350 | 40 | 255.3 | 93.8 | 0.63 |
| 8 | 0 | 10 | ---- | 7.81 | 3.39 | 0.57 |
| 9 | 15 | 10 | 40 | 7.44 | 3.13 | 0.58 |
| 10 | 0 | 20 | ---- | 16.55 | 6.88 | 0.59 |
| 11 | 20 | 20 | 50 | 14.69 | 5.68 | 0.61 |

[1] Fraction 2 of Table I; viscosity at 210° F. of about 3.08 centistokes.
[2] Dow Corning DC–200 Silicone Fluid.
[3] Viscosity Temperature Coefficient, $1-\frac{\text{vis. at } 210° F.}{\text{vis. at } 100° F.}$ The liquid lubricating compositions of Examples 3, 4, 6, 7, 9 and 11 are particularly useful as oils for aircraft components, as oils for chemical process machinery operating at elevated temperatures and in corrosive atmospheres, and as oils for low temperature operations where wax formation or excessive stiffening cannot be tolerated.

Figure 2:
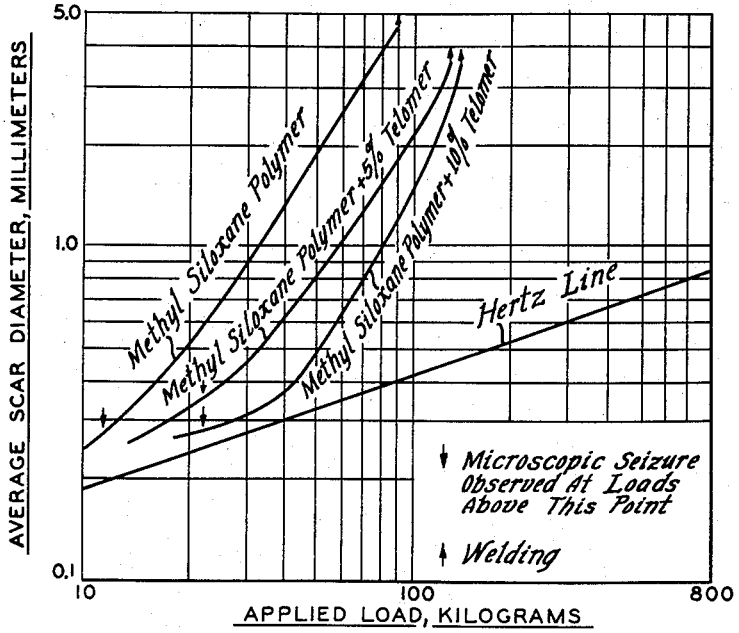

The accompanying Figures 1 and 2 are based on the results obtained in the above Examples 2–4 and Examples 5–7, respectively. In these figures the line designated as the Hertz line was calculated from the formula developed by H. Hertz for determining the diameter of the contact area between two spherical surfaces. This diameter is the static indentation caused by deformation of the balls under load at the start of the test. The Hertz equation is as follows:

$$d_H = 8.73 \times 10^{-2} \sqrt[3]{P}$$

where $d_H$=Hertz diameter in millimeters and $P$=applied vertical load in kilograms. As indicated above, the Point B value represents that point on the wear-load diagram at which marked deviations from the Hertz line occurs. In the accompanying Figures 1 and 2 the symbol (↓) indicates the load at which microscopic seizure is first observed between the lubricated steel balls of the Shell Four-Ball Tester, and the symbol (↑) indicates that load at which welding occurs between the steel balls. In Figure 1 the line designated as "methyl siloxane polymer" represents the wear-load diagram of pure Dow Corning DC–200–50 silicone fluid, the number after 200 indicating the viscosity of the fluid at 77° F., namely, 50 centistokes. From the figure it is seen that the Point B value of this pure silicone fluid is about 8 kilograms as indicated for Example 2 above. The lines designated as "methyl siloxane polymer plus 5 percent telomer" and "methyl siloxane polymer plus 10 percent telomer" are the wear-load diagrams obtained for the lubricating compositions of Examples 3 and 4, respectively. From Figure 1 it is seen that the Point B values of these two compositions, or the loads at which marked deviation from the Hertz line occurs, are 18 and 30 kilograms, respectively.

In Figure 2, the line designated as "methyl siloxane polymer" represents the wear-load diagram of pure Dow Corning DC–200–350 silicone fluid, that is, purely dimethyl siloxane polymer having a viscosity at 77° F. of 350 centistokes. From this figure it is seen that the Point B value of this pure silicone fluid is about 10 kilograms. The lines designated as "methyl siloxane polymer plus 5 percent telomer" and "methyl siloxane polymer plus 10 percent telomer" are the wear-load diagrams obtained for the lubricating compositions of Examples 6 and 7, respectively. From Figure 2 it is seen that the Point B values of these two compositions are 24 and 40 kilograms, respectively.

From Figure 1 and Figure 2, it is readily seen that the admixtures containing a trifluorochloroethylene telomer having the general formula $Cl(CF_2CFCl)_nCl$, and silicone oil possess improved lubricity and weld characteristics as compared to either component alone.

EXAMPLE 12

The silicone fluid employed in this example was a mixture containing 64 percent by volume of the dimethyl siloxane polymer having a viscosity of 50 centistokes at 77° F., namely Dow Corning DC 200–50 silicone fluid, and 36 percent by volume of the dimethyl siloxane polymer having a viscosity at 77° F. of 350 centistokes, namely, Dow Corning 200–350 silicone fluid. The viscosity of this mixture at 100° F. was found to be about 90 centistokes. The telomer oil employed in this example was the sulfuryl chloride telomer of trifluorochloroethylene designated as Fraction 3 (boiling point 132°–208° C. at 1 mm. Hg pressure) of the above Table I. A novel liquid lubricating composition was prepared by blending 10 percent by weight of the telomer into the mixture of methyl siloxane polymers at room temperature. The Point B value of this admixture was found to be 40 kilograms as determined in the Shell Four-Ball Tester using a one minute application of the machine. This value is considerably higher than the Point B value of either the mixture of the siloxane polymers or telomer oil employed in this example. Welding did not occur between the steel balls of the Shell FourBall Tester when lubricated with the lubricating composition of this example at loads below 150 kilograms.

When about 100 grams of the liquid lubricating composition of Example 12 is thickened by the addition thereto of about 10 grams of the butylated estersil, commercially available as Estersil-GT, a grease composition is obtained containing about 10 weight percent of estersil. The Point B value of this grease composition is the same as that of the liquid telomer oil: silicone oil admixture of this example, namely, about 40 kilograms.

EXAMPLE 13

The sulfuryl chloride-trifluorochloroethylene telomer employed in this example was that designated as Fraction 3 of the above Table I (boiling point 132°–208° C. at 1 mm. Hg pressure, viscosity at 210° F. or 10 centistokes) and was prepared as described in Example 1 above. The silicone oil employed was the methyl siloxane polymer having a viscosity at 100° F. of about 70 centistokes and sold by the General Electric Company under the trade designation 9981–LT–NV–70. An intimate admixture containing 10 percent by weight of the telomer and 90 percent by weight of the methyl siloxane polymer was prepared by blending the two components at room temperature with mechanical agitation of the blend. The resulting liquid lubricating composition was then tested in the Shell Four-Ball Tester and was found to have a Point B value (one-minute application of the machine) of 24.0 kilograms, a viscosity temperature coefficient of 0.61 and a viscosity index of 153. This liquid lubricating composition is particularly useful as a relatively non-flammable hydraulic fluid.

The lubricity properties of the admixture of this example also are surprising and are considerably better than either the methyl siloxane polymer alone, or in combination with an additive such as a trialkyl phosphate. For example, when an admixture containing 10 percent of tri-(2-ethylhexyl) phosphate and 90 percent of the General Electric 9981–LT–NV–70 silicone fluid was tested in the Shell Four-Ball Tester under the same conditions employed to test the telomer oil: 9981–LT–NV–70 methyl siloxane polymer admixture, it was found to have a Point B value of only 11 kilograms.

EXAMPLE 14

An admixture containing 10 percent by weight of the sulfuryl chloride-trifluorochloroethylene telomer designated as Fraction 2 of the above Table I, 60 percent by volume of the methyl phenyl siloxane polymer having a viscosity of 100 centistokes at 25° C. and containing a low ratio of phenyl to methyl groups (Dow Corning DC–510–100 silicone fluid) and 30 percent by volume, of di-(2-ethylhexyl) sebacate, was prepared by intimately admixing these ingredients at room temperature with mechanical agitation. The Point B value of this admixture was found to be about 50 kilograms as determined in the Shell Four-Ball Tester using a one minute application of the machine. The viscosity temperature coefficient as defined in Table II was found to be 0.66. The Point B value of this liquid lubricating composition is much greater than the Point B value of either the telomer oil, silicone oil or diester alone or of a blend of silicone fluid and diester lubricant.

It has been found that the admixture of low molecular weight telomers of trifluorochloroethylene with other synthetic lubricating oils does not always produce a lubricating composition having improved load-carrying properties. For example, the addition of 5 percent of the sulfuryl chloride-trifluorochloroethylene telomer oil designated as Fraction 2 of the above Table I, to an oil soluble polyalkylene glycol sold by Carbide and Carbon Chemicals, New York, under the trade designation Ucon LB–285 was found to have a Point B value of 45 kilograms which was the same as the Point B value of the pure Ucon LB–285 lubricant. Just why the low molecular polymers of a perfluorochloroethylene such as the $Cl(CF_2-CFCl)_nCl$ telomers, exert a beneficial effect on the load-carrying properties of the silicone fluids and not on a different class of synthetic lubricant such as the polyalkylene glycols is not understood or clear.

As is apparent the present invention relates to novel compositions which comprise an admixture of a low molecular weight polymer of a perfluorochloroolefin and a liquid silicone. The particularly preferred components are the low molecular weight telomers of trifluorochloroethylene having a plurality of trifluorochloroethylene monomer units and chlorine terminal groups and the liquid methyl siloxane polymers. The novel compositions of the present invention including the normally liquid and grease compositions have particularly improved load-carrying properties than either of the individual components alone. Other alterations and modifications of the compositions of the present invention and of the method of preparing these compositions may become apparent to those skilled in the art without departing from the scope of the present invention.

I claim:

1. A novel lubricant composition of high load-carrying capacity consisting essentially of an admixture of up to about 20 weight percent of said admixture of a liquid open chain telomer of trifluorochloroethylene having between about 4 and about 20 carbon atoms and containing a plurality of trifluorochloroethylene monomer units and chlorine terminal groups and a liquid linear siloxane polymer selected from the group consisting of methyl phenyl siloxane polymer, methyl p-bromophenyl siloxane polymer, methyl p-chlorophenyl siloxane polymer, methyl m-trifluoromethyl phenyl siloxane polymer, methyl 3,4-dichlorophenyl siloxane polymer, and dimethyl siloxane polymer having a viscosity of at least 10 centistokes at 25° C.

2. A novel lubricant composition of high load-carrying capacity consisting essentially of an admixture of up to about 20 weight percent of said admixture of a liquid open chain telomer of trifluorochloroethylene having between about 4 and about 20 carbon atoms and containing a plurality of trifluorochloroethylene monomer units and chlorine terminal groups and a liquid dimethyl siloxane polymer having a viscosity of at least 10 centistokes at 25° C.

3. A novel lubricant of high load-carrying capacity consisting essentially of an admixture of 10 weight percent of said admixture of a liquid open chain telomer of trifluorochloroethylene having between about 4 and about 20 carbon atoms and containing a plurality of trifluorochloroethylene monomer units and chlorine terminal groups, 60 volume percent of a liquid methyl phenyl siloxane polymer having a viscosity of at least 10 centistokes at 25° C., and 30 volume percent of di-(2-ethylhexyl)sebacate.

References Cited in the file of this patent

UNITED STATES PATENTS

| | | |
|---|---|---|
| 2,623,852 | Peterson | Dec. 30, 1952 |
| 2,679,479 | Peterson | May 25, 1954 |
| 2,681,940 | Ruh | June 22, 1954 |
| 2,704,363 | Armstrong | Mar. 15, 1955 |
| 2,705,700 | Iler | Apr. 5, 1955 |
| 2,746,922 | Braendle | May 22, 1956 |
| 2,770,659 | Barnhart | Nov. 13, 1956 |

OTHER REFERENCES

Miller et al.: Ind. and Chem. Engr., March 1947, vol. 39, No. 3, pp. 333–36.

UNITED STATES PATENT OFFICE

CERTIFICATE OF CORRECTION

Patent No. 2,927,893            March 8, 1960

Dickson E. Neunherz

It is hereby certified that error appears in the printed specification of the above numbered patent requiring correction and that the said Letters Patent should read as corrected below.

Column 6, line 33, for "type if" read -- type of --; column 9, line 10, for "purely" read -- pure --; line 65, for "or" read -- of --.

Signed and sealed this 16th day of August 1960.

(SEAL)
Attest:

KARL H. AXLINE
Attesting Officer

ROBERT C. WATSON
Commissioner of Patents